(12) United States Patent
Breant et al.

(10) Patent No.: US 6,239,219 B1
(45) Date of Patent: May 29, 2001

(54) THERMOPLASTIC COMPOSITIONS WITH IMPROVED FIRE RESISTANCE

(75) Inventors: Patrice Breant, Serquigny; Olivier Poyet, Paris, both of (FR)

(73) Assignee: Atofina (FR)

( * ) Notice: Subject to any disclaimer, the term of this patent is extended or adjusted under 35 U.S.C. 154(b) by 0 days.

(21) Appl. No.: 09/444,640

(22) Filed: Nov. 22, 1999

Related U.S. Application Data

(63) Continuation-in-part of application No. 08/681,055, filed on Jul. 22, 1996, now abandoned.

(30) Foreign Application Priority Data

Jul. 21, 1995 (FR) .................................................. 95 08890

(51) Int. Cl.$^7$ ...................................................... C08K 5/34
(52) U.S. Cl. ........................ 525/101; 524/386; 524/387; 524/388; 524/409; 524/410
(58) Field of Search ..................... 524/386, 387, 524/388, 410, 411, 101

(56) References Cited

U.S. PATENT DOCUMENTS

| | | | |
|---|---|---|---|
| 4,001,177 | * | 1/1977 | Tsutsumi et al. ..................... 524/101 |
| 4,198,493 | * | 4/1980 | Marciandi et al. ................... 524/101 |
| 4,317,766 | * | 3/1982 | Kawasaki et al. ................... 524/101 |
| 4,786,673 | * | 11/1988 | Morival et al. ...................... 524/101 |
| 5,037,869 | * | 8/1991 | Sprenkle . |
| 5,185,103 | * | 2/1993 | Eswarakrishan . |
| 5,424,344 | * | 6/1995 | Lewin . |
| 6,025,423 | * | 2/2000 | Breant . |

FOREIGN PATENT DOCUMENTS

| | | | |
|---|---|---|---|
| 122697 | * | 10/1984 | (EP) . |
| 51-571241 | * | 11/1993 | (EP) . |
| 51-23563 | * | 2/1976 | (JP) . |
| 51-73047 | * | 6/1976 | (JP) . |

OTHER PUBLICATIONS

Pitts, Janes J.—"Antimony—Halogen Synergy . . ." J. Fire and Flammability—51–58 (1972).*

* cited by examiner

*Primary Examiner*—Veronica P. Hoke
(74) *Attorney, Agent, or Firm*—Pennie & Edmonds LLP

(57) ABSTRACT

Thermoplastic compositions based on, in particular, polyamide resin(s) or alkenylaromatic resin(s), having improved fire resistance are disclosed. The compositions contain $Sb_2O_3$, melamine cyanurate and one or more polyols, the combination of which exhibits a synergistic effect on increasing the fire retardancy. These compositions can be used for the preparation of molded, extruded or injected articles, in the form of sheets or films, of composite materials and of powders for coating substrates. Further, the process for preparing the compositions is also disclosed.

5 Claims, 5 Drawing Sheets

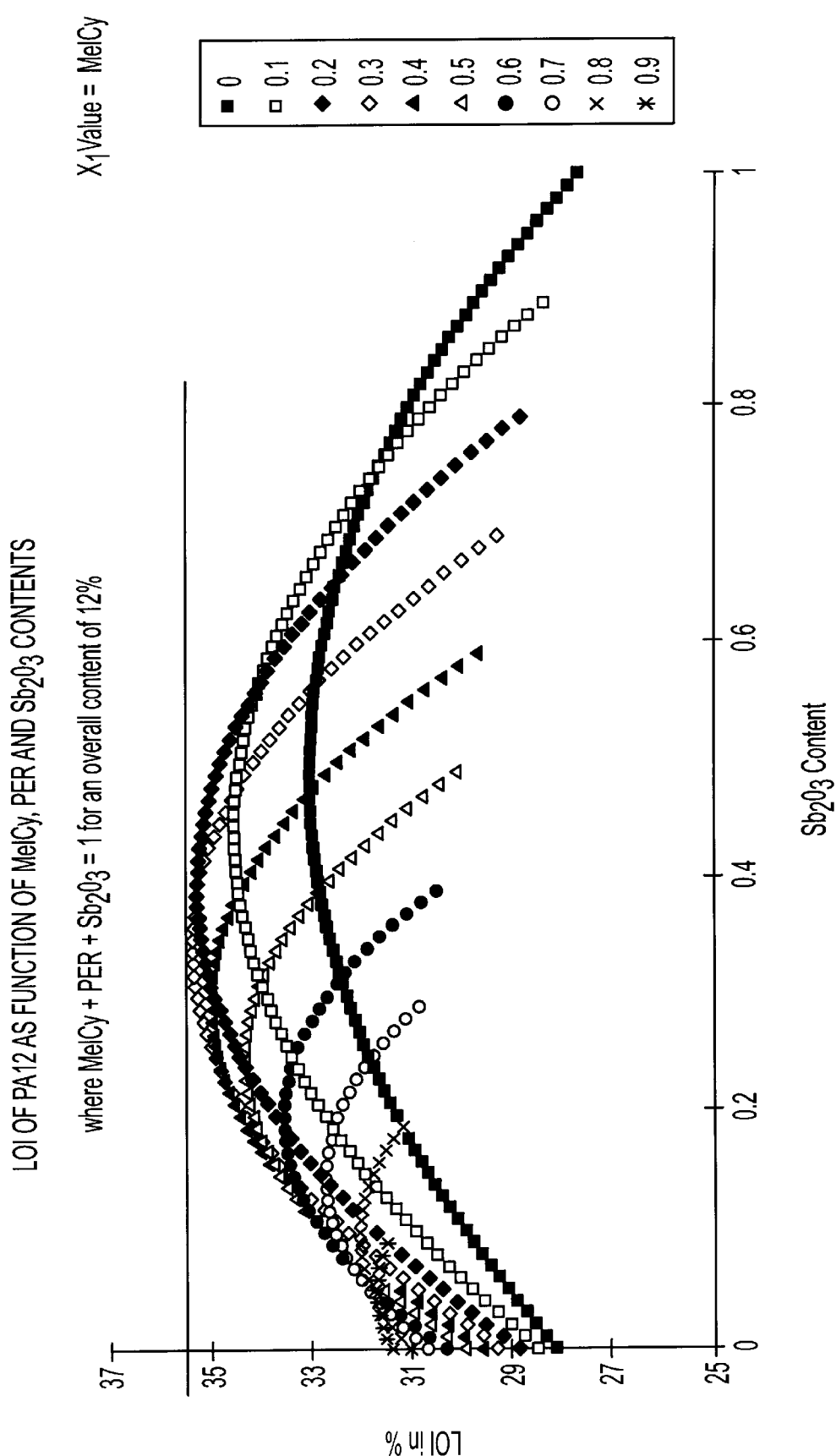

THERMOPLASTIC COMPOSITIONS WITH IMPROVED FIRE RESISTANCE

1. CROSS-REFERENCE TO RELATED APPLICATION

This is a continuation-in-part of application Ser. No. 08/681,055 filed Jul. 22, 1996 now abandoned.

2. BACKGROUND OF THE INVENTION

2.1 Technical Field

The subject of the present invention is thermoplastic compositions with improved fire resistance and in particular compositions based on polyamide resins and/or on alkenylaromatic (co)polymers. The fire resistance is assessed, on the one hand, by the resistance to combustion or to self-ignition and, on the other hand, by the susceptibility to dripping.

2.2 Background Art

Due to their excellent physical properties, thermoplastic polyamide resins are widely used in many applications in the automobile industry, aeronautics, the electrical field, and the like, but their development has been held back because of their combustibility.

Many solutions have been proposed in the literature for improving the resistance to combustion of polyamide-based thermoplastic compositions.

Halogenated derivatives such as decabromodiphenyl ether, optionally in combination with $Sb_2O_3$, have been added to polyamide resins, but halogenated compounds generate acid halides which are given off during the manufacture and/or during the use of the compositions in which they are incorporated, thus resulting in risks of corrosion of the equipment and pollution of the environment.

Antimony oxide, $Sb_2O_3$ is also used in combination with magnesium hydroxide and optionally melamine cyanurate in EP 571,241 for imparting flame-retardancy to thermoplastic polyamide compositions.

It is also known to incorporate phosphorus or its derivatives, such as red phosphorus (U.S. Pat. No. 3,778,407), phosphites or phosphates, but these products are difficult to use and confer an undesirable reddish tinge to polyamide compositions.

Melamine cyanurate improves the resistance to combustion of polyamides but it is not as effective, weight for weight, as some compounds containing a high chlorine or bromine content.

While the aforementioned compounds listed significantly reduce the combustibility of the resins in which they are incorporated, their influence on the susceptibility to dripping is low.

In EP 169,085, a polyol and melamine cyanurate are simultaneously added to polyamide-based compositions, which makes it possible to improve the susceptibility to dripping, but to an extent which is somewhat less than desired.

Alkenylaromatic hydrocarbon polymers and copolymers exhibit poor fire resistance and burn easily.

It is known to add flame-retarding agents to these polymers or copolymers and to the compositions containing them. The most commonly used are compounds containing at least one halogen atom, generally bromine.

It is also known, from JP-A-54/85242, to impart flame-retardancy to polystyrene by means of 3 to 50 parts by weight of melamine cyanurate per 100 parts by weight of polystyrene.

Non-flammable, injection-mouldable thermoplastic compositions comprising at least 60% by weight of melamine and at most 40% by weight of polystyrene are also known from FR-A-2,096,230.

Compositions comprising from 30 to 80 parts by weight of polystyrene, from 20 to 70 parts by weight of melamine and from 0.05 to 5 parts by weight (expressed as phosphorus) of a phosphorus-containing compound are known from JP-A-54/46250.

In EP 438,939, there are described thermoplastic compositions containing at least one alkenylaromatic hydrocarbon (co)polymer, at least one nitrogen-containing compound chosen from melamine and melamine isocyanurate, at least one polyol containing at least 4 hydroxyl functional groups per molecule and, optionally, at least one organic ester of phosphoric acid.

3. SUMMARY OF THE INVENTION

The thermoplastic compositions with improved fire resistance according to the invention, are, in particular, based on polyamide resin(s) or on alkenylaromatic resin(s) and comprise:

antimony oxide $Sb_2O_3$;

melamine cyanurate; and one or a number of polyols.

These compositions can be used for the preparation of molded, extruded or injected articles, in the form of sheets or films, of composite materials and of powders for coating substrates.

4. BRIEF DESCRIPTION OF THE DRAWINGS

FIG. 5 shows the LOI of PA-12 as a function of melamine cyanurate, PER and $Sb_2O_3$.

5. DETAILED DESCRIPTION OF THE INVENTION

Figure 1:
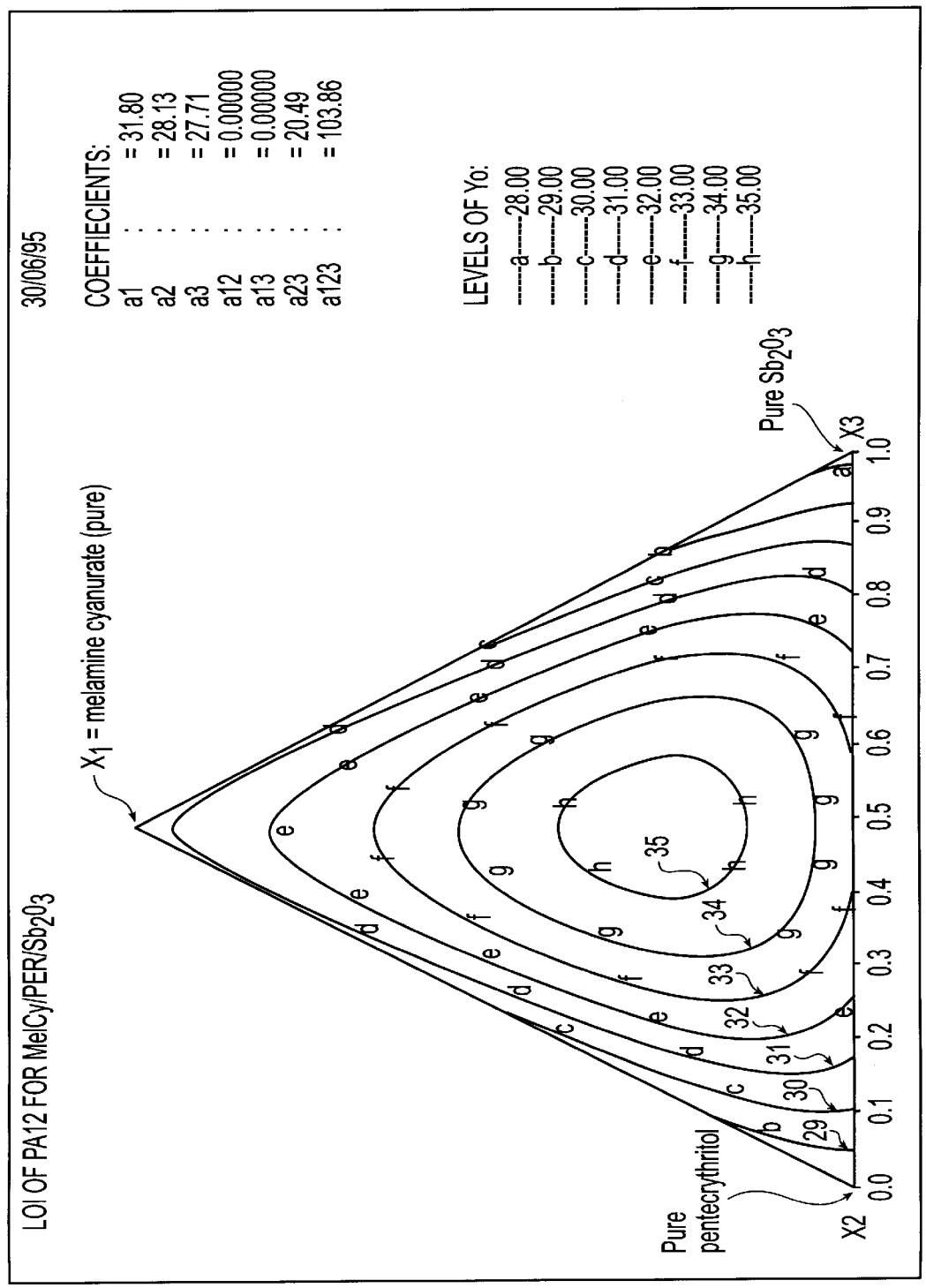
FIG. 1 shows the LOI iso-response curves of PA-12 showing a synergy among PER, $Sb_2O_3$ and melamine cyanurate.

Among the thermoplastic compositions according to the invention, mention will very particularly be made of those based on polyamide resin(s) which contain aliphatic and/or cycloaliphatic and/or aromatic units. They can be obtained by anionic polymerization of one or a number of lactams, such as caprolactam, oenantholactam, dodecalactam or laurolactam, or by hydrolytic lactam polycondensation, either of one or a number of amino acids, such as aminocaproic, 7-aminoheptanoic, 11-aminoundecanoic and 12-aminododecanoic acids, or of one or a number of salts or mixtures of diamines, such as hexamethylenediamine, dodecamethylenediamine, meta-xylene-diamine, bisfpara-amino-cyclohexyl) methane or trimethylhexamethylenediamine, with diacids, such as iso- and terephthalic, adipic, azelaic, suberic, sebacic and dodecanedicarboxylic acids, or from mixtures of these monomers resulting in copolyamides.

PA according to the invention is also understood to mean polyamide-based thermoplastic elastomers (TPE) which are block copolymers, also known as polyetheramides or polyesteramides, the rigid blocks of which are composed of polyamide and the crystallizable flexible blocks of polyether or of polyester.

PA according to the invention is also understood to mean mixtures of different polyamides listed above with each other and also their mixtures with other polymers, such as polyolefins, provided that PA or PAs represent at least 50% of the total weight of the mixture. Mention will very particularly be made of mixtures of PA and of polyolefin elastomers which improve the impact strength of PAs. Mention may be made, as examples of these impact reinforcers, of ethylene and propylene rubbers (EPR), ethylene-propylene-diene rubbers (EPDM), ethylene and vinyl acetate (EVA) copolymers, ethylene-acrylic ester-maleic anhydride terpolymers or terpolymers based on ethylene-acrylic derivatives (EAD).

PAs can be plasticized using additives commonly used for this type of modification. They can contain fillers and/or various additives, for example those intended to protect the PA against thermal oxidation or thermal/UV degradation, processing aids, such as lubricants, dyes or pigments, and the like.

Mention will also very particularly be made, among the thermoplastic compositions according to the invention, of those based on alkenylaromatic hydrocarbon (co)polymer(s).

Alkenylaromatic hydrocarbon polymer is understood to mean, according to the present invention, the product from the homopolymerization of an ethylenically unsaturated aromatic hydrocarbon, such as styrene, alpha-methylstyrene, vinyltoluenes, vinylxylenes or methylethylstyrenes.

Alkenylaromatic hydrocarbon copolymer is understood to mean, according to the present invention, the product from the copolymerization of a number of the alkenylaromatic hydrocarbons mentioned in the preceding paragraph or else of at least one of these hydrocarbons with at least one other copolymerizable monomer, such as acrylic acid, methacrylic acid, maleic anhydride, alkyl (meth)acrylates in which the alkyl radical comprises from 1 to 8 carbon atoms, acrylonitrile or 1,3-butadiene.

Other thermoplastic resins which may, if appropriate, be combined with the alkenylaromatic hydrocarbon polymer or copolymer are understood to mean in particular, according to the present invention:

poly(phenylene ether);

polyethylene and copolymers of ethylene and of at least one alpha-olefin having from 3 to 8 carbon atoms, wherein these last two resins can be made compatible by means of a grafted or branched ethylene/styrene copolymer, in accordance, for example, with GB 870, 650;

homopolymers and copolymers based on esters of acrylic or methacrylic acid, such as poly(methyl methacrylate);

copolymers of ethylene and of at least one unsaturated polar comonomer, such as vinyl acetate, alkyl (meth) acrylates, acrylic acid, methacrylic acid or maleic anhydride; and polycarbonate.

The thermoplastic material can comprise the alkenylaromatic hydrocarbon polymer or copolymer and the thermoplastic resin in any proportion. It will advantageously comprise from 10 to 90% by weight of one and from 90 to 10% by weight of the other. Preferably, when the thermoplastic material comprises an ethylene-based polymer or copolymer, the alkenylaromatic hydrocarbon polymer or copolymer is included at more than 50% by weight in the said material.

Other elastomeric resins which may, if appropriate, be combined with the alkenylaromatic hydrocarbon polymer or copolymer is understood to mean in particular, according to the present invention, at least one of the following polymers, which may or may not carry polymerized alkenylaromatic hydrocarbon grafts: a polyolefin elastomer, such as a terpolymer of ethylene with at least one alpha-olefin having from 3 to 6 carbon atoms and at least one diene, particularly ethylene-propylene-diene terpolymers, the diene being chosen from conjugated or non-conjugated, linear or cyclic dienes, such as, for example, butadiene, isoprene, 1, 3-pentadiene, 1, 4-pentadiene, 1,4-hexadiene, 1, 5-hexadiene, 1,9-decadiene, 5-methylene-2-norbornene, 5-vinyl-2-norbornene, 2-alkyl-2,5-norbornadienes, 5-ethylidene-2-norbornene, 5-(2-propenyl)-2-norbornene, 5-(5-hexenyl)-2-norbornene, 1,5-cyclooctadiene, bicyclo [2.2.2] octa-2,5-diene, cyclopentadiene, 4,7,8,9-tetrahydroindene and isopropylidenetetrahydroindene. Such elastomeric terpolymers which can be used in accordance with the present invention generally comprise between 15 mol % and 60 mol % of units derived from propylene and between 0.1 mol % and 20 mol % of units derived from the diene. The other elastomeric resin can also be a styrene/butadiene rubber, a polydiene rubber, such as polybutadiene and polyisoprene, nitrile rubber or ethylene/propylene rubber. The other elastomeric resin is generally used in an amount at most equal to 20 weight %, and preferably between 5 weight % and 15 weight %, with respect to the weight of the thermoplastic material.

In addition to the preceding resins, the compositions according to the invention can also contain other thermoplastic resins, such as polyolefins, polyurethanes, and the like.

The antimony oxide is generally provided in the form of a fine powder, the particle size of which is of the order of one (1) μm.

Melamine cyanurate (MC) is understood to mean compounds resulting from the reaction of melamine with cyanuric acid and particularly the compound resulting from the equimolar reaction of melamine with cyanuric acid, wherein the latter can be in the enol or ketone form.

Polyol is understood to mean compounds containing at least four (4) alcohol functional groups such as tetrols, erythritol or monopentaerythritol (PER) and its polysubstituted derivatives, pentols such as xylitol or arabitol and hexols such as mannitol or sorbitol and its higher homologues.

The incorporation of $Sb_2O_3$, melamine cyanurate and polyol or polyols, known as the 3 fire-retardant additives according to the invention, and optional additives, which are finely divided, in the compositions according to the invention, in particular PA-based compositions, is generally carried out by mixing in the PA resin in the molten state; the mixing temperature is generally between 150° and 300° C. and preferably between 180° and 230° C.

The compositions based on an alkenylaromatic hydrocarbon (co)polymer, more simply PS resins, according to the invention, are generally prepared by dry mixing the constituents, if they are all solid at ambient temperature, in a powder mixer into which the different constituents of the composition are introduced in the powder state, or at most in the form of pearls in the case of the alkenylaromatic hydrocarbon (co)polymers. After mixing for 20 minutes, the mixture is generally ready for use. It is also possible to prepare these compositions by mixing the different constituents at a temperature greater than the softening point of the alkenylaromatic hydrocarbon (co)polymer or of the additional resin defined above if the latter is present, for example in the range of 150° to 200° C., in an internal mixer or in an extruder, generally for 1 to 5 minutes. The compositions are then extruded and converted to homogeneous ready-to-use granules.

A masterbatch or a final product can be also prepared. The masterbatch has the advantage of ensuring good predispersion of the constituents which will be mixed once again during the dilution of the masterbatch in the final resin.

The resin of the masterbatch may be identical to or different from the final resin.

It has been found that a master-batch based on a thermoplastic elastomer, especially based on PA, is particularly advantageous for subsequent dilutions in many PA resins, among which may be mentioned PA-11, PA-12, PA-12,12, PA-6, PA-6,12 or thermoplastic elastomers based on PA-11, PA-12 or PA-6.

It is possible to produce a masterbatch based on the additional resin or resins and then to dilute it in the final resin. This system is particularly advantageous in the case of PA resins impact-strengthened with polyolefinic elastomers: the 3 fire-retardant additives mixed with the polyolefinic elastomer constitute the masterbatch which is subsequently diluted in the PA or PS resin.

The 3 fire-retardant additives according to the invention generally represent from 40 to 60% of the total weight of the masterbatch. In the final PA-based compositions, they generally represent from 5 to 20% of the total weight of the composition and preferably from 10 to 15% by weight. Each of the 3 additives according to the invention represents at least 15% of the total weight of the 3 additives. The preferred compositions are those in which each of the 3 fire-retardant additives represents approximately one third of the total weight of the 3 additives.

The compositions according to the invention find applications in different fields by conversion into industrial articles intended in particular for the automobile, aeronautics, domestic electrical appliance, audio-visual equipment and electrical equipment industries; they are well suited to the production of cable-related components, for example, of electrical equipment. They are particularly suited to conversion into molded, extruded or injected articles, into films, sheets, fibres, composite materials such as coextruded articles or multilayer films, and into powders for coating substrates.

Throughout the remainder of the text, the intrinsic viscosity of the PAs is measured at 25° C. in meta-cresol for 0.5 g of polymer in 100 ml of metacresol.

The melting point of the PA resins is measured according to ASTM Standard D 3418 and their Shore D hardness is measured according to ASTM Standard D 2240.

Except where otherwise indicated, proportions are expressed by weight.

6. DESCRIPTION OF PREFERRED EMBODIMENTS

6.1 Preparation of Masterbatches MB1 to MB8

Various additives, the respective nature and proportions (% by weight) of which are listed in Table 1, and coPA-6/12 granules are charged to a Melli internal mixer, the vessel of which has been preheated to 100° C. The additives represent 50% of the total weight of the masterbatch.

The polyamide, coPA-6/12 (melting point: 130° C.; Shore D hardness: 60) is marketed by Elf Atochem S. A.

The melamine cyanurate (MC) used is available from Chemie-Linz AG.

The monopentaerythritol (PER) used is marketed by Celanese, Corp.

The additive, $Sb_2O_3$ is marketed by Cookson under the name Timonox®.

The ammonium polyphosphate (APP) is marketed by Hoechst under the name Exolit 622.

The zeolite (ZEO) is marketed by the Ceca S. A. under the name of zeolite A4.

The titanium oxide of fine particle size (approximately 1 μm) is marketed by Thann & Mulhouse under the name RL 90.

TABLE 1

| Master-batch No. | MC | PER | $Sb_2O_3$ | APP | ZEO | $TiO_2$ |
|---|---|---|---|---|---|---|
| MB1 | 27.75 | 5.55 | | 16.7 | | |
| MB2 | 35.75 | 7.15 | | 7.1 | | |
| MB3 | 35.75 | 7.15 | | | 7.1 | |
| MB4 | 35.75 | 7.15 | | | | 7.1 |
| MB5 | 35.75 | 7.15 | 7.1 | | | |
| MB6 | 35.75 | 7.15 | | 3.55 | 3.55 | |
| MB7 | 31.25 | 12.5 | | 3.125 | 3.125 | |
| MB8 | 41.7 | 8.3 | | | | |

EXAMPLES 1 to 14

The above masterbatches are then diluted with PA-11 (intrinsic viscosity: 1; melting point: 185° C.) or PA-12 (intrinsic viscosity: 1; melting point: 175° C.) marketed by Elf Atochem S. A., in a Brabender ZSK counterrotating twin-screw extruder (screw speed 60 rev/min; throughput 2 kg/h; temperature profile 180-210-230° C.).

The fire resistance is evaluated by measuring the oxygen limit index (OLI) on ISO Standard R178 rods (80×10×4 mm³) obtained on a Mining press under the following conditions from the above samples and, for comparison, from:

a. PA-12 without fire-resistance additives;

b. PA-11 without fire-resistance additives; and c. a composition based on PA-11 according to the teaching of EP 169,085 containing PER and MC but neither $Sb_2O_3$ nor halogenated compound (melting point: 185° C.).

Injection temperature: 235 ° C. for PA-12 without fire-resistance additives;

225° C. for composition based on PA-12;

215° C. for PA-12 without fire-resistance additives; and

215° C. for composition based on PA-11.

Temperature of the mold: Ambient temperature.

Injection cycle: 15 s of injection proper, then maintenance under a press for 15 s.

The results of OLI measurement and the concentration of masterbatch (% by weight are combined in Table 2.

TABLE 2

| Example No. | PA Nature | Master-batch | Dilution (%) | OLI (%) |
|---|---|---|---|---|
| 1 | PA-12 | MB8 | 24 | 30 |
| 2 | PA-12 | MB1 | 36 | 27 |
| 3 | PA-12 | MB7 | 36 | 29 |
| 4 | PA-12 | MB2 | 28 | 30 |
| 5 | PA-12 | MB3 | 28 | 30 |
| 6 | PA-12 | MB6 | 28 | 27 |
| 7 | PA-12 | MB7 | 28 | 29 |
| 8 | PA-12 | MB7 | 32 | 31 |
| 9 | PA-11 | MB8 | 24 | 36 |
| 10 | PA-12 | MB4 | 28 | 30 |
| 11 | PA-12 | MB5 | 28 | 35 |
| 12 | PA-12 | | | 23 |

TABLE 2-continued

| Example No. | PA Nature | Master-batch | Dilution (%) | OLI (%) |
|---|---|---|---|---|
| 13 | PA-11 | | | 26 |
| 14 | PA-12 | | | 36 |

EXAMPLES 15 to 23

Compositions containing 86% by weight of PA-12, 10% of MC, 2% of PER which were described above and 2% of various additives are produced under operating conditions identical to those of the samples of Examples 1 to 14.

The characteristics of the additives are as follows:

$Sb_2O_3$ is identical to that used previously.

The magnesium hydroxide $Mg(OH)_2$ with a particle size of 1 μm is marketed by Martinswerke under the name Martifin®H10.

The aluminium hydroxide $Al(OH)_3$ with a particle size of 1 μm is marketed by Martinswerke under the name Martinale®OL111LE.

The boehmite AlO.OH with a particle size of 1 μm is marketed by Vaw Aluminium.

The silica $SiO_2$ has a particle size of 1 μm.

The dibutyltin dilaurate (DBTDL) is marketed by Merck.

The ortho-boric acid $H_3BO_3$ is marketed by Prolabo.

The samples are then shaped in the form of rods in accordance with ISO Standard R178 in a way identical to that of Examples 1 to 14 and their OLI is measured. The results are combined in Table 3.

TABLE 3

| Example No. | Additive nature | OLI (%) |
|---|---|---|
| 15 | — | 29.7 |
| 16 | $Sb_2O_3$ | 34 |
| 17 | $Mg(OH)_2$ | 26.5 |
| 18 | $AL(OH)_3$ | 28 |
| 19 | ALO.OH | 28.5 |
| 20 | DBTDL | 29 |
| 21 | $Fe_2O_3$ | 29.8 |
| 22 | $SiO_2$ | 29.2 |
| 23 | $H_3BO_3$ | 27.2 |

EXAMPLES 24 to 33

Compositions based on different PA-based resins containing 10% of MC, 2% of PER which are described above and 2% of $Sb_2O_3$ and, by way of comparison, $Sb_2O$-free compositions are prepared.

The PA-12 is identical to that used in Examples 1 to 8 and 10 to 12.

The coPA-6/12 is identical to that used in masterbatches MB 1 to MB8.

The PEBA (polyether-block amide), marketed by Elf Atochem S. A., is a polyamide-based thermoplastic elastomer in which the polyether blocks are of polytetramethylene glycol (PTMG) and represent 33% of the total weight of the PEBA and the PA blocks are of PA-12 (66% of the total weight of the PEBA) (melting point: 159° C.; Shore D hardness: 55).

The PP/PA-6 mixture (melting point: 220° C.) is a compatabilized alloy marketed by the Applicant Company.

The PA-6 used is a molding grade and its melting temperature is equal to 218° C.

The samples are then shaped in the form of rods in accordance with ISO Standard R178 in a manner identical to that of the samples of Examples 1 to 23 and their OLI and the difference between the OLI of the compositions with and without $Sb_2O_3$ are measured. The results are combined in Table 4.

TABLE 4

| Example No. | PA resin nature | Presence or absence of $Sb_2O_3$ | OLI (%) | ΔOLI |
|---|---|---|---|---|
| 24 | PA-12 | — | 29.7 | |
| 25 | PA-12 | $Sb_2O_3$ | 33.6 | +3.3 |
| 26 | PA-6/12 | — | 28.3 | |
| 27 | PA-6/12 | $Sb_2O_3$ | 30.2 | +1.9 |
| 28 | PEBA | — | 22.7 | |
| 29 | PEBA | $Sb_2O_3$ | 26.5 | +3.8 |
| 30 | PA-6/PP mixture | — | 20.3 | |
| 31 | PA-6/PP mixture | $Sb_2O_3$ | 21.6 | +1.3 |
| 32 | PA-6 | — | 24 | |
| 33 | PA-6 | $Sb_2O_3$ | 38 | +14 |

EXAMPLES 34 to 43

Different mixtures according to the invention in which the melamine cyanurate, the monopentaerythritol and/or the $Sb_2O_3$ represent 12% of the total weight of each of the mixtures are prepared from the PA-12 described above by direct extrusion of the PA-12 and additives in a Buss Ko-Kneader extruder (screw speed 45 rev/min; throughput 25 kg/h; temperature profile 220-270-220-220-240° C.).

The samples are then shaped in the form of rods in accordance with ISO Standard R178 in a way identical to that of the samples of Examples 1 to 33 and their OLI's are measured.

TABLE 5

| Example No. | MC (%) | PER (%) | $Sb_2O_3$ (%) | OLI (%) |
|---|---|---|---|---|
| 34 | 10.2 | 1.8 | 0 | 29 |
| 35 | 7.56 | 0.84 | 3.6 | 32 |
| 36 | 4.2 | 4.2 | 3.6 | 35 |
| 37 | 3.6 | 3.6 | 4.8 | 36 |
| 38 | 3.6 | 7.2 | 1.2 | 32 |
| 39 | 2.4 | 2.4 | 7.2 | 34 |
| 40 | 0 | 6 | 6 | 28 |
| 41 | 12 | 0 | 0 | 32 |
| 42 | 0 | 12 | 0 | 28 |
| 43 | 0 | 0 | 12 | 27 |

6.2 Preparation of the Masterbatch MB9

A masterbatch based on 40% by weight of coPA-6/12 described above, 43% of melamine cyanurate, 8.5% of monopentaerythritol and 8.5% of $Sb_2O_3$ is prepared in a Werner® 40 extruder equipped with a corotating twin screw (screw speed 150 rev/min; throughput 24 kg/h; temperature profile 230-180-195-180-180-180-185-190-195-170-190-230° C.).

EXAMPLES 44 to 52

Different amounts of the above masterbatch are then mixed mechanically with PA-11 or PA-12 with an intrinsic viscosity equal to 1. The degrees of dilution and the PA which is being diluted are shown in Table 6.

TABLE 6

| Dilution with | Example No. | | | |
|---|---|---|---|---|
| | 0% dilution | 10% dilution | 20% dilution | 30% dilution |
| PA-12 | 44 | 45 | 46 | 47 |
| PA-11 | 48 | 49 | 50 | 51 and 52* |

*Example 52 is prepared by direct extrusion of all the constituents without an intermediate masterbatch.

The fire resistance (OLI & UL 94) and the mechanical properties of the compositions obtained are evaluated on rods, dumbbells or sheets according to the operating conditions of the measuring standards used. The results are combined in Table 7.

TABLE 7

| | Ex. 44 | Ex. 45 | Ex. 46 | Ex. 47 | Ex. 48 | Ex. 49 | Ex. 50 | Ex. 51 | Ex. 52 |
|---|---|---|---|---|---|---|---|---|---|
| EB (%)[1] | 383 | 79 | 42 | 17 | 379 | 16 | 22 | 13 | 96 |
| TS[2] | 64 | 32 | 33 | 39 | 63 | 33 | 32 | 35 | 35 |
| FM[3] | 1184 | 1202 | 1243 | 1349 | 1124 | 1257 | 1124 | 1152 | 1348 |
| Impact[4] at 23° C. | 100 nb | 14.1 | 14.7 | 10.2 | 100 nb | 17.7 | 11.3 | 14.1 | 100 nb |
| Impact at −40° C. | 100 nb | 15.8 | 11.4 | 8.3 | 100 nb | 12.6 | 9 | 9 | 100 nb |
| Vicat point[5] | 173 | 170 | 168 | 164 | 183 | 181 | 179 | 176 | 182 |
| OLI[6] 1.6 mm | 25 | 33.7 | 35.7 | 34 | 24.5 | 32.9 | 37.4 | 37.2 | 39.5 |
| OLI 3.2 mm | 23.4 | 31.1 | 34.9 | 34.7 | 25.8 | 30.2 | 35.9 | 35 | 35.5 |
| UL 94[7] 1.6 mm | 94V2 | 94V0 | 94V0 | 94V0 | 94V2 | 94V2 | 94V0 | 94V0 | 94V0 |
| UL 94 3.2 mm | 94V2 | 94V2 | 94V0 | 94V0 | 94V2 | 94V2 | 94V2 | 94V0 | 94V0 |

[1,2]The dynamometric properties EB (elongation at break) to ISO and TS (tensile strength) are measured according Standard R 527 1B.
[3]The flexural modulus (FM) is measured according to ISO Standard 178.
[4]The Charpy impact strength is measured at 23 and −40° C. according to ISO Standard 179.
[5]The Vicat point is measured according to ISO Standard 306.
[6]The OLI is measured as above.
[7]The resistance to dripping is evaluated according to NF Standard T 51 0272.

6.3 Preparation of Masterbatch MB10

Under the same operative conditions as for MB9 and with the same proportions of additives, a master-batch MB10 is prepared in which the PA resin is a PEBA based on PTMG (50% of the total weight of the PEBA) and on PA-12 (50% of the total weight of the PEBA) marketed by Elf Atochem S. A. under the name Pebax MX1205 (melting point: 147° C.; Shore D hardness: 40).

EXAMPLES 53 to 65

Different amounts of the above masterbatch are then diluted with PA-based resins using an extruder. The fire resistance (UL 94 and OLI) of the samples of Examples 53 to 58 is measured according to the standards thus defined above. Table 8 gives the UL 94/OLI ratio.

TABLE 8

| Example No. | MB10 dilution (%) | Rigid PA-12 | Rigid PA-11 | Plasticized PA-12 | Rigid PA-12 + 30% FG* | PEBA 1 | PEBA 2 | PEBA 3 |
|---|---|---|---|---|---|---|---|---|
| 53 | 0 | V2/24 | V2/25 | | | | | |
| 54 | 10 | V2/30 | V2/31 | V2/24 | | | | |
| 55 | 12.5 | | | | | V2/26 | V2/26 | V2/26 |
| 56 | 15 | | | V2/26 | | | | |
| 57 | 20 | V0/35 | V0/36 | V2/27 | V2/23 | V2/27 | V2/26 | V2/27 |
| 58 | 30 | V0/35 | V0/37 | | | | | |

*FG = Fiber Glass

The rigid PA-12 has an intrinsic viscosity equal to 1 and its melting point is equal to 175° C.

The rigid PA-11 has as an intrinsic viscosity equal to 1 and its melting point is equal to 185° C.

The PEBA 1 marketed by Elf Atochem S. A. is a thermoplastic elastomer of PEBA (polyether-block amide) type based on PA-12 (80%) and on PTMG (20%) (melting point: 169° C.; Shore D hardness: 63).

The PEBA 2 marketed by Elf Atochem S. A. is a thermoplastic elastomer of PEBA type based on PA-12 (80%) and on polyethylene glycol (PEG) (20%) (melting point: 158° C.; Shore D hardness: 40)

The PEBA 3 marketed by Elf Atochem S. A. is a thermoplastic elastomer of PEBA type based on PA-12 (75%) and on PEG (25%) (melting point: 169° C.; Shore D hardness: 60)

The fire resistance of the samples of Examples 59 to 62 (diluted in the plasticized PA-12 used previously) is measured according to the incandescent wire technique at 850° C. according to CEI Standard 695-2-1; the results are combined in Table 9.

TABLE 9

| Example No. | MB 10 dilution (%) | Extinction time (s) | Flame height (cm) |
|---|---|---|---|
| 59 | 0 | 28 | 15 |
| 60 | 10 | 15 | 14 |
| 61 | 20 | 14 | 12 |
| 62 | 30 | 10 | 10 |

Some mechanical properties (EB, TS, FM and Charpy impact) of the samples of Examples ∇to 65 are evaluated. The results are combined in Table 10.

The samples of Examples 63 to 65 are MB10-based compositions which are or are not diluted in PEBA 1 in the proportion of 0% (Example 63), 12.5% (Example 64), and 20% (Example 65).

TABLE 10

| Example No. | EB (%) | TS (Mpa) | FM (Mpa) | Impact at 23° C. (kJ/m$^2$) | Impact at −40° C. (kJ/m$^2$) |
|---|---|---|---|---|---|
| 59 | 382 | 49 | 438 | nb* | 4.4 |
| 60 | 352 | 41 | 474 | 45.1 | 6.1 |
| 61 | 338 | 37 | 492 | 39.2 | 6.2 |
| 62 | 310 | 34 | 507 | 36.8 | 6 |
| 63 | | | 290 | nb | 15 |
| 64 | | | 370 | nb | 16 |
| 65 | | | 380 | nb | 16.5 |

*not broken

6.4 Fire Retardancy of RILSAN Polyamides

A strong synergy among melamine cyanurate (MC), pentaerythritol (PER) and antimony oxide (Sb$_2$O$_3$) has been demonstrated in the fire retardancy test of RILSAN polyamides.

In this study, a constant overall additive content of 12% by weight in the nylon-12 RILSAN AMNO.D, is maintained, which is reasonable from an economic standpoint and effective.

The synergy is demonstrated by implementing an experimental design called a mixture design based on measuring a fire-resistance property, such as the limiting oxygen index (LOI), for 7 suitable formulations as described in Table 11. Two separate measurements of LOI for each formulation were made.

TABLE 11

| EXPT. | MC Content in % | PER Content in % | Sb$_2$O$_3$ Content in % | Reduced MC content | Reduced PER content | Reduced Sb$_2$O$_3$ content | LOI (%) run 1 | LOI (%) run 2 |
|---|---|---|---|---|---|---|---|---|
| 1 | 12 | 0 | 0 | 1 | 0 | 0 | 30.7 | 31.7 |
| 2 | 0 | 12 | 0 | 0 | 1 | 0 | 28.3 | 28.3 |
| 3 | 0 | 0 | 12 | 0 | 0 | 1 | 28.3 | 26.7 |
| 4 | 6 | 6 | 0 | 0.5 | 0.5 | 0 | 29.7 | 29.2 |
| 5 | 6 | 0 | 6 | 0.5 | 0 | 0.5 | 30.3 | 29.7 |
| 6 | 0 | 6 | 6 | 0 | 0.5 | 0.5 | 33.6 | 32.8 |
| 7 | 4 | 4 | 4 | 0.3333 | 0.3333 | 0.3333 | 34.4 | 34.8 |
| 8 | 8 | 2 | 2 | 0.6666 | 0.1667 | 0.1667 | 33.9 | 35 |

Experiments 1 to 7 serve to determine the mathematical equation relating to the response (LOI) to the factors, these being the contents of the various additives.

$$LOI = \Sigma a_i X_i + \Sigma a_{ij} X_i X_j + a_{123} X_1 X_2 X_3$$

wherein a represents the coefficients to be determined and $X_i$ represents the reduced content of additive i.

Experiment 8 is used to validate the mathematical equation. It represents the formulation evaluated during the first sighting experiments.

It should be noted that, in all cases:

$$X_1 + X_2 + X_3 = 1$$

The various coefficients a are determined using the variance regression method (LUMIERE SOFTWARE).

The following mathematical equation (1) is obtained:

$$LOI = 31.79 X_1 + 28.12 X_2 + 27.70 X_3 + 20.49 X_2 X_3 + 103.86 X_1 X_2 X_3 \quad (1)$$

The standard deviation of the regression is 0.9, which is similar to the usual standard deviation in the measurement of an oxygen index. Equation (1) is statistically satisfactory for representing the behavior of LOI as a function of the MC, PER and Sb$_2$O$_3$ contents, expressed as reduced contents.

It is possible to plot the iso-response curves of the expression (1) in the field of variation of the additive contents which, in the present case, can be presented by an equilateral triangle, each side of which has a standardized length equal to 1.

Figure 2:
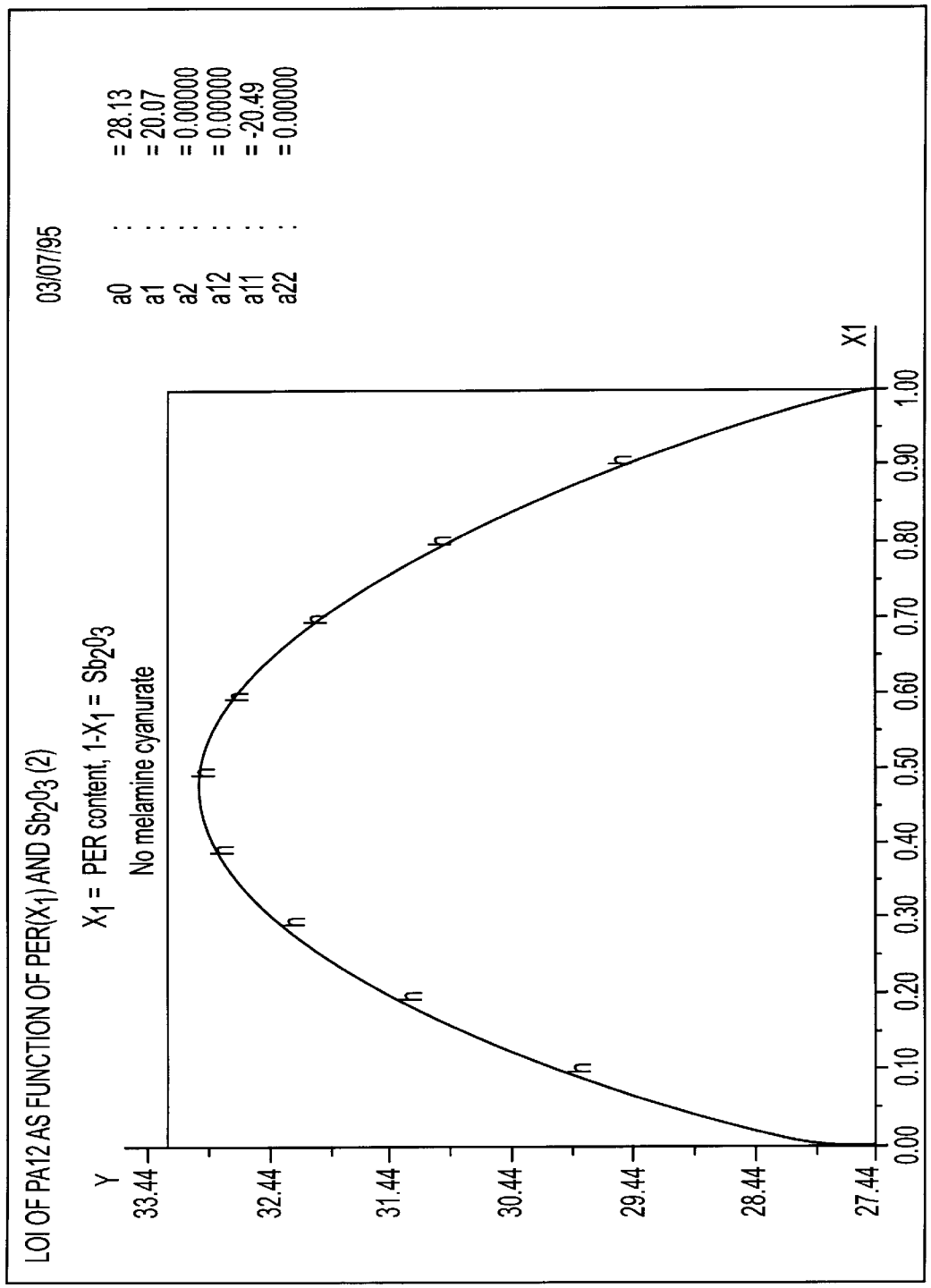
FIG. 2 shows the LOI of PA-12 as a function of PER and $Sb_2O_3$.
Figure 3:
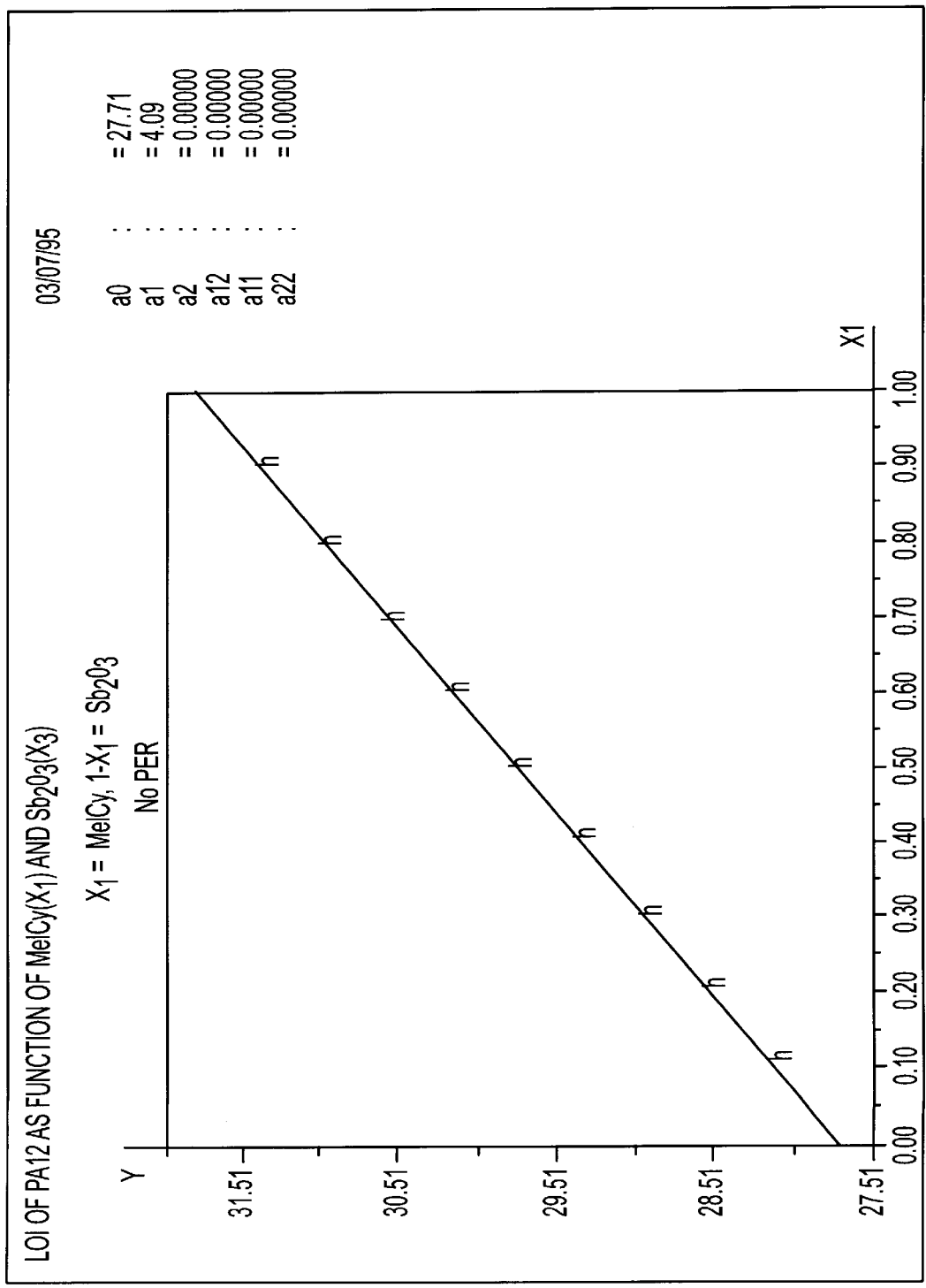
FIG. 3 shows the LOI of PA-12 as a function of melamine cyanurate and $Sb_2O_3$.
Figure 4:
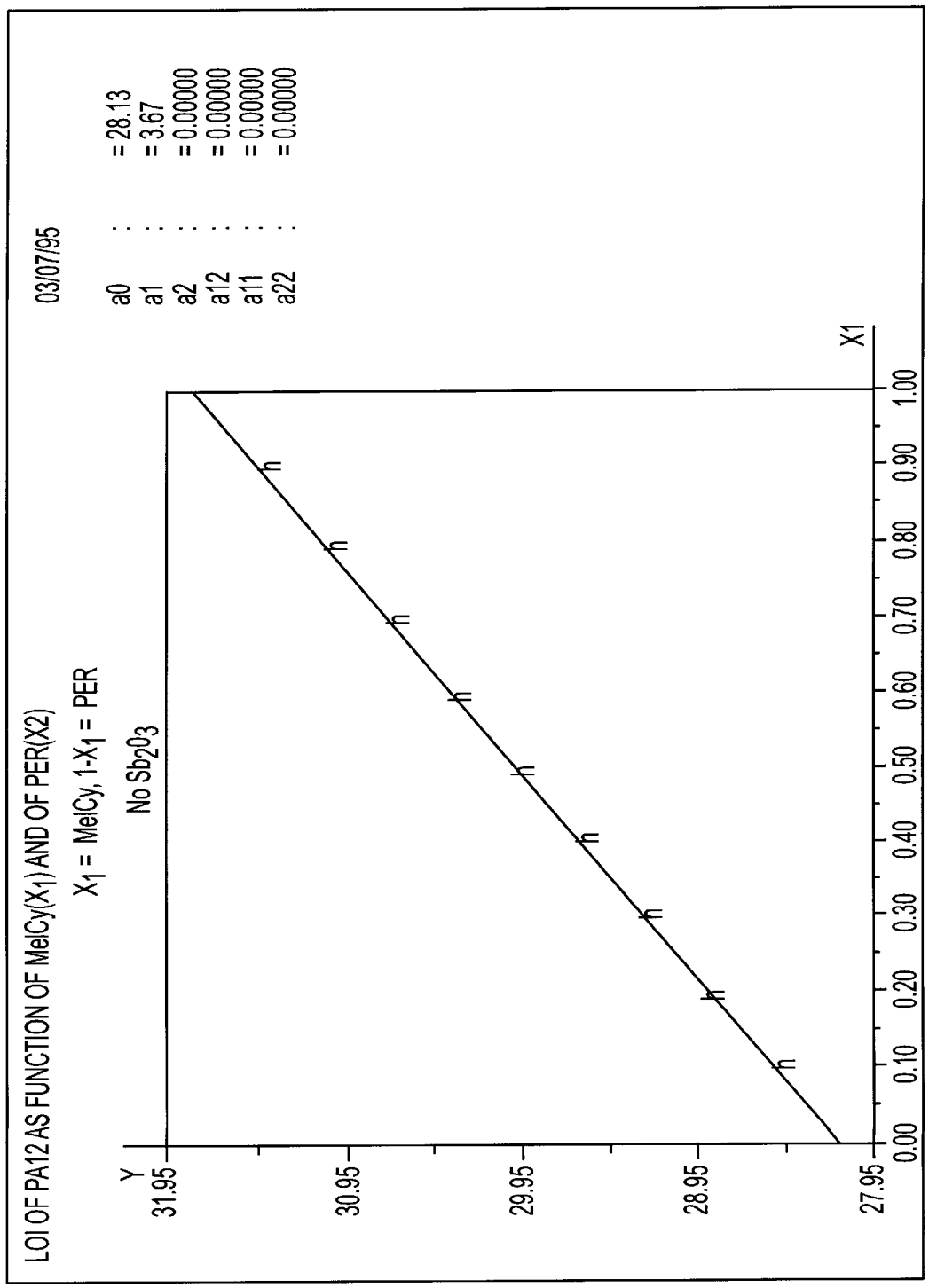
FIG. 4 shows the LOI of PA-12 as a function of melamine cyanurate and PER.

FIG. 1 shows the LOI behavior and demonstrates a synergy between PER and Sb$_2$O$_3$ ($X_2$ and $X_3$) (see also FIG. 2). Even stronger synergy can be seen among the three additives. There is a simple additive effect between And PER and between MC and Sb$_2$O$_3$ (FIGS. 3 and 4). FIG. 5 is another representation, different from but equivalent to FIG. 1. It shows that, for an overall additive content of 12% by weight, the maximum LOI is obtained for a composition close to:

| | |
|---|---|
| MC = 0.3 | (i.e. 3.6% by weight) |
| PER = 0.35 | (i.e. 4.2% by weight) |
| Sb$_2$O$_3$ = 0.35 | (i.e. 4.2% by weight.) |

Theoretically, this optimum composition is valid only for an overall additive content of 12%. However, it is reasonable to infer that the similar relative proportions of the three additives should be necessary for similar overall additive contents (for example, from 10 to 15%). The optimum LOI value, of course, depends on the overall additive content and increases with it.

We claim:

1. Thermoplastic compositions with improved fire resistance, comprising: thermoplastic polyamide resin and a mixture of Sb$_2$O$_3$, melamine cyanurate and at least one polyol, wherein
   the polyol contains at least four alcohol functional groups;
   the mixture comprises 10 to 15% of the total weight of the thermoplastic composition; and
   each of the Sb$_2$O$_3$, melamine cyanurate and at least one polyol comprises approximately equal amount by weight.

2. The thermoplastic compositions of claim 1, wherein the thermoplastic polyamide resin is selected from the group consisting of PA-11, PA-12, PA-12,12, coPA-6/12 and PEBA which is an elastomer comprising polytetramethylene glycol blocks and PA-12 blocks in a 1:2 weight ratio.

3. The thermoplastic compositions of claim 1, wherein polyol is a monopentaerythritol.

4. Process for the preparation of the compositions according to claim 1, comprising mixing the different constituents in the molten state at a temperature greater than the softening point of the thermoplastic polyamide resin.

5. An industrial article obtained by conversion of the compositions as defined in claim 1.

* * * * *